United States Patent
Rigby

(10) Patent No.: US 11,860,632 B2
(45) Date of Patent: Jan. 2, 2024

(54) WEAPON SYSTEM

(71) Applicant: BAE SYSTEMS plc, London (GB)

(72) Inventor: Keith Antony Rigby, Preston Lancashire (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 17/755,839

(22) PCT Filed: Nov. 5, 2020

(86) PCT No.: PCT/GB2020/052801
§ 371 (c)(1),
(2) Date: May 10, 2022

(87) PCT Pub. No.: WO2021/094712
PCT Pub. Date: May 20, 2021

(65) Prior Publication Data
US 2022/0404832 A1    Dec. 22, 2022

(30) Foreign Application Priority Data

Nov. 14, 2019    (GB) .................................... 1916570

(51) Int. Cl.
*G05D 1/00* (2006.01)
*B64D 7/00* (2006.01)
(Continued)

(52) U.S. Cl.
CPC .............. *G05D 1/0094* (2013.01); *B64D 7/00* (2013.01); *F41H 11/02* (2013.01); *F41H 13/005* (2013.01)

(58) Field of Classification Search
CPC ......... G05D 1/0094; B64D 7/00; F41H 11/02; F41H 13/005; F41A 27/28; F41A 27/30; F41G 3/12; F41G 3/06; F41G 3/16
(Continued)

(56) References Cited

U.S. PATENT DOCUMENTS

| 5,837,918 A | 11/1998 | Sepp | |
|---|---|---|---|
| 2006/0219839 A1* | 10/2006 | Schneider | ............... F42B 15/01 244/3.26 |

(Continued)

FOREIGN PATENT DOCUMENTS

| CA | 3130461 A1 * | 8/2020 | ............... B64D 7/00 |
|---|---|---|---|
| EP | 3199905 B1 | 12/2018 | |

(Continued)

OTHER PUBLICATIONS

International Search Report and Written Opinion received for PCT/GB2020/052801. dated Feb. 11, 2021. 11 pages.
(Continued)

*Primary Examiner* — Edwyn Labaze
(74) *Attorney, Agent, or Firm* — Finch & Maloney PLLC

(57) ABSTRACT

According to an aspect of the invention, there is provided a weapon system for use on a vehicle, comprising: a control system, the control system configured to, in response to a determination that a line-of-sight from the weapon system to a target of the weapon system is currently, or going to be obscured, trigger an alteration of a configuration of the vehicle such that the line-of-sight to the target is not obscured. Thus, the weapon system can ensure a line-of-sight of the target, allowing it to be successfully engaged.

20 Claims, 4 Drawing Sheets

Figure 1:
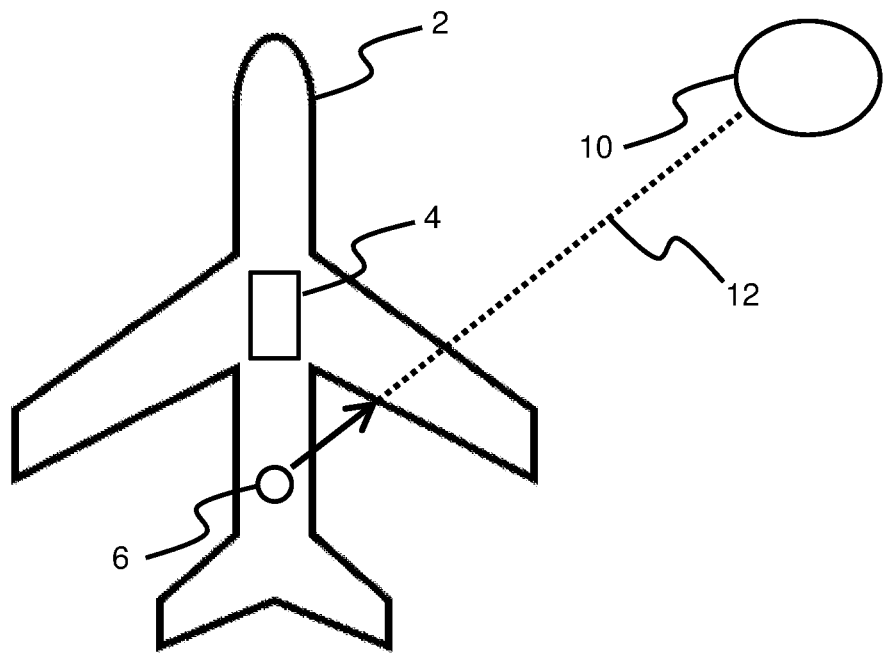

(51) Int. Cl.
*F41H 11/02* (2006.01)
*F41H 13/00* (2006.01)

(58) Field of Classification Search
USPC ............. 235/407, 400, 404, 411, 412, 414
See application file for complete search history.

(56) References Cited

U.S. PATENT DOCUMENTS

| | | | |
|---|---|---|---|
| 2012/0211589 A1* | 8/2012 | Uzman | G05D 1/0038 244/3.13 |
| 2016/0266244 A1* | 9/2016 | Holmes | G01S 17/66 |
| 2017/0299318 A1 | 10/2017 | Oesmann et al. | |
| 2018/0046187 A1 | 2/2018 | Martirosyan et al. | |
| 2018/0293909 A1* | 10/2018 | Lechner | G09B 9/006 |
| 2019/0137219 A1* | 5/2019 | Bockmon | F41G 5/16 |

FOREIGN PATENT DOCUMENTS

| | | | |
|---|---|---|---|
| EP | 3581877 A1 | 12/2019 | |
| WO | 2021094712 A1 | 5/2021 | |

OTHER PUBLICATIONS

GB Search Report under Section 17(5) received for GB Application No. 1916570.3, dated May 6, 2020. 3 pages.
International Preliminary Report on Patentability received for PCT/GB2020/052801. dated May 27, 2022. 7 pages.

* cited by examiner

WEAPON SYSTEM

The present invention relates generally to a weapon system, and in particular to a weapon system for use on a vehicle. The present invention also relates generally to related vehicles and methods.

BACKGROUND

If a weapon is to be used to protect a vehicle against incoming threats, for example missiles, one of the most challenging problems is to ensure that there is a complete $4\pi$ steradian coverage of the area around the vehicle, or at least coverage that is as good as practically possible. Parts of the vehicle may obscure the sightlines of output or outlets of the weapon, for example apertures of the weapon, meaning that the area covered is less than $4\pi$ steradians at any one time. Some systems, such as Directed Infrared Countermeasure Systems (DIRCMs) employ gimbals to increase coverage above what would be possible with a static installation. However, in reality, the number of gimballed apertures required to provide full coverage would be impractical, for example in terms of cost, weight, complexity, and so on, balanced against the related benefits of such coverage. As such, there exists a need for a method of extending the coverage provided by a weapon, in a practical manner, and for example up to the full $4\pi$ steradians.

SUMMARY OF INVENTION

It is an aim of example embodiments to at least partially overcome or avoid one or more disadvantages of the prior art, described above or elsewhere, or to at least provide an improved or even an alternative weapon system to those already in existence.

According to the present invention there is provided an apparatus and method as set forth in the appended claims. Other features of the invention will be apparent from the dependent claims, and the description which follows.

According to an aspect of the invention, there is provided a weapon system for use on a vehicle, the weapon system comprising: a control system, the control system configured to, in response to a determination that a line-of-sight from the weapon system to a target of the weapon system is currently, or going to be obscured, trigger an alteration of a configuration of the vehicle such that the line-of-sight to the target is not obscured. Thus, the weapon system can ensure a line-of-sight of the target, allowing it to be successfully engaged.

The control system may be configured to trigger the alteration of the configuration of the vehicle such that the line-of-sight to the target is not obscured by an element of the vehicle. Thus, the control system can prevent damage to the vehicle, as the target will not be engaged if an element of the vehicle is in the line-of-sight of the weapon.

The control system may be configured to trigger an alteration of the vehicle so as to enable the weapon system to continuously engage the target during relative movement between the weapon system and the target. Thus, the control system can allow for continuous engagement of the target, with no obscuration.

The control system may be configured to determine whether the line-of-sight to the target is currently, or going to be obscured. Thus, a simple control system capable of co-operating with external sensors can be provided.

The weapon system may further comprise a directed-energy weapon configured to output an energy beam at the target. Thus, the weapon system can minimise the problems relating to ammunition supply, or to more accurate engage a target with greater efficiency or effectiveness. The directed-energy weapon may comprise a laser directed-energy weapon. Thus, the weapon system can provide a weapon with a very high range, and with almost instant engagement.

The directed-energy weapon may comprise one or more apertures for outputting an energy beam, optionally one or more gimballed apertures. Thus, the coverage around the vehicle can be increased. Use of a single aperture (or a relatively small number of apertures) may be possible, according to principles of the invention.

The control system may control the directed-energy weapon to employ one of the apertures, based on probability of successfully engaging the target. Thus, the system can ensure that the most appropriate aperture, which provides the greatest probability of neutralising the threat, is employed. This may be balanced against the need to alter the configuration of the vehicle to avoid the obscuration, for example in terms of speed of engagement, efficiency of effectiveness of engagement, and so on.

The control system may be configured to, in response to the determination that the line-of-sight to the target is currently, or going to be obscured, override any vehicle configuration commands provided by a controller (e.g. user, or at least partially automated control system) of the vehicle, such that the line-of-sight to the target is not to be obscured. Thus, the control system can override any commands in order to provide and prioritise protection of the vehicle.

The control system may be configured to trigger an alteration of the configuration of the vehicle by triggering an alteration of an attitude of the vehicle. Thus, the control system can quickly and easily ensure that the line-of-sight to the target is no longer obscured. Also, the direction of travel of the vehicle is not impacted upon, minimising disruption to the travel, or control of travel, of the vehicle.

The vehicle may comprise one of: an air platform, a land vehicle, and a watercraft. Thus, the weapon system can be employed on a variety of vehicles in different environments.

According to another exemplary embodiment, provided is a vehicle having a control system according to an aspect of the invention. The vehicle could be built with the system, or the system could be retrofitted to the vehicle. This could be a software upgrade, or a hardware upgrade.

According to another exemplary embodiment, provided is a method of controlling a weapon system of a vehicle, comprising the steps of: in response to a determination that a line-of-sight from the weapon system to a target of the weapon system is currently, or going to be obscured, triggering an alteration of a configuration of the vehicle such that the line-of-sight to the target is not obscured.

The method may further comprise the step of, in response to determining that the line-of-sight from the weapon system to the target of the weapon system is currently, or going to be obscured, overriding any commands provided by a controller (e.g. user, or at least partially automated control system) of the vehicle, so that the line-of-sight is not to be obscured. Thus, the control system can override any commands in order to provide protection of the vehicle.

Altering the configuration of the vehicle may comprise altering an attitude of the vehicle. Thus, the control system can quickly and easily ensure that the line-of-sight to the target is no longer obscured.

Although a few preferred embodiments of the present invention have been shown and described, it will be appreciated by those skilled in the art that various changes and modifications might be made without departing from the scope of the invention, as defined in the appended claims.

LIST OF FIGURES

Figure 2:
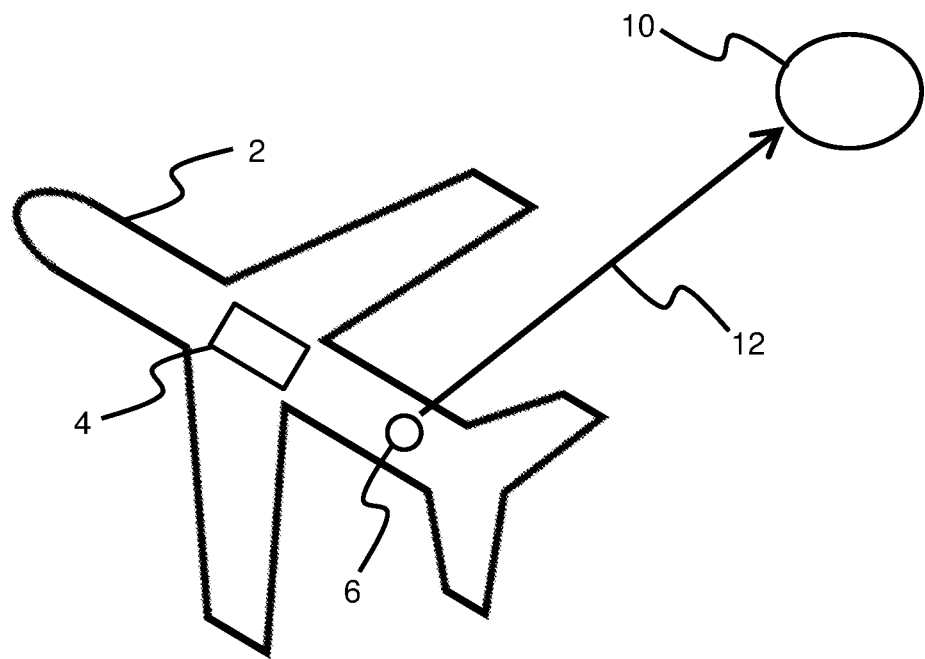
Figure 3:
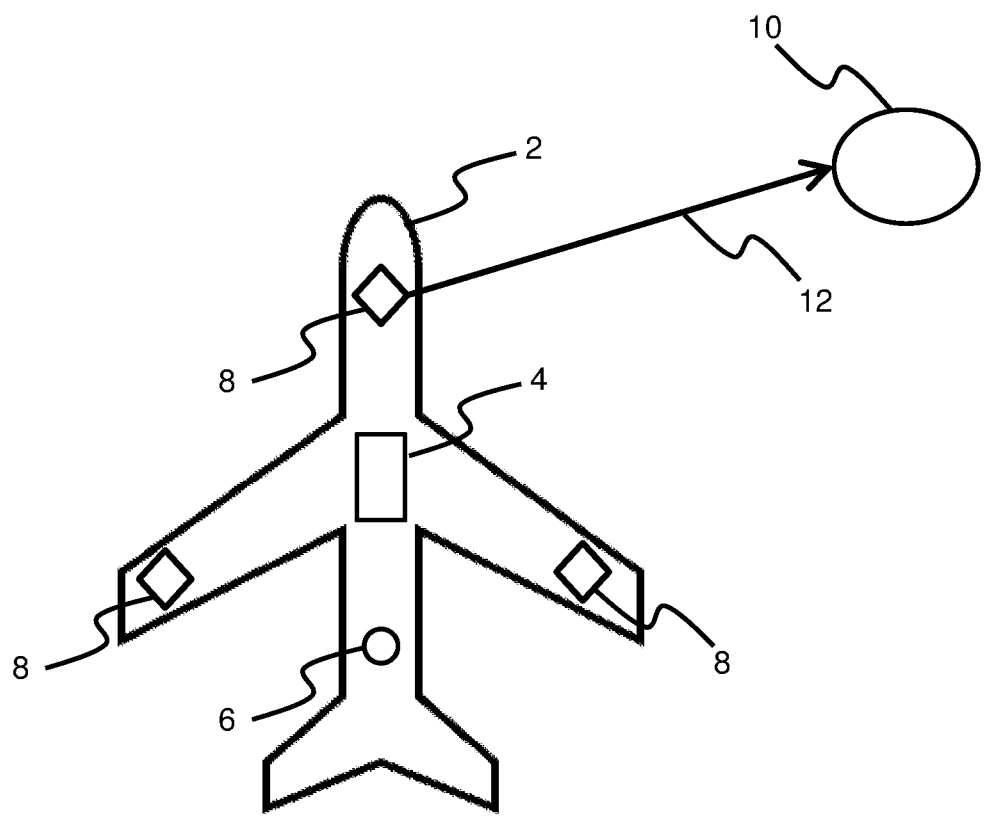
Figure 4:
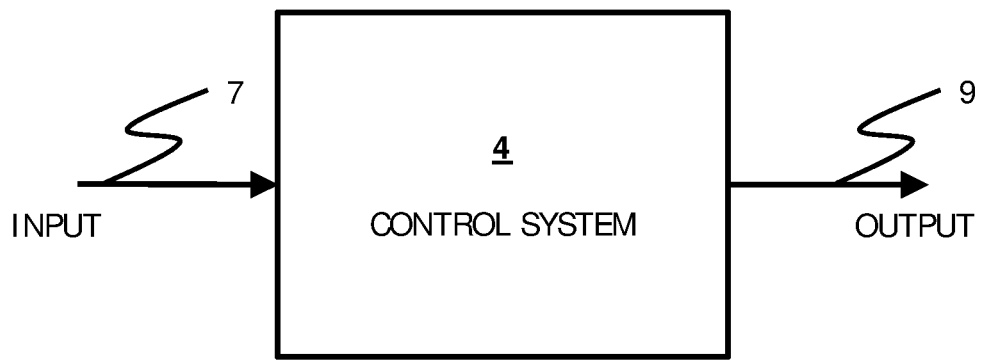
Figure 5:
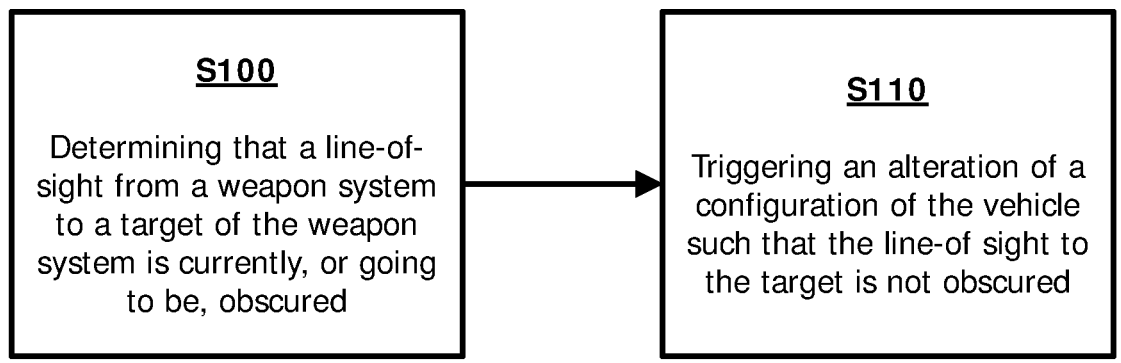

For a better understanding of the invention, and to show how embodiments of the same may be carried into effect, reference will now be made, by way of example only, to the accompanying diagrammatic Figures in which:

FIGS. 1 and 2 schematically depict a weapon system for use on a vehicle according to an example embodiment;

FIG. 3 schematically depicts a weapon system for use on a vehicle according to another example embodiment;

FIG. 4 schematically depicts a control system of a weapon system for use on a vehicle according to an example embodiment; and FIG. 5 depicts example methodology according to an example embodiment.

DESCRIPTION

FIG. 1 schematically depicts a weapon system for use on a vehicle 2. The vehicle 2 could be any vehicle useful for the particular application, and capable of carrying or otherwise being connected to a weapon system. For instance, the vehicle 2 could be a military vehicle, such as a land-based vehicle, a naval vessel, or an aircraft. The vehicle is movable in at least one axis. Furthermore, the vehicle could be a manned vehicle, or an unmanned vehicle. In this particular example, and strictly by way of example only, the vehicle 2 is an aircraft.

In this particular example, the vehicle 2 comprises a weapon 6. The weapon 6 could be any ranged weapon, such as a missile, or a directed-energy weapon ("DEW") configured to output an energy beam at a target. Typically, and for particular synergy with the present invention, the weapon 6 is a line-of-sight weapon, in terms of firing a projectile or a beam that is unguided, and so where line-of-sight is an important factor, especially near the vehicle.

In particular, the weapon 6 could be a laser directed energy weapon ("LDEW"). The weapon 6 may be employed to protect the vehicle 2 against incoming threats, such as missiles. However, one of the most challenging problems is maximising the coverage, e.g. field of view of the weapon 6, around the vehicle 2, as parts of the vehicle may obscure the sightlines of the weapon 6. For example, and strictly by way of example only, as shown in FIG. 1, a line-of-sight 12 of the weapon 6 to a target 10 may be obscured by a wing part of the vehicle 2. In this situation, deploying the weapon 6 to attack or generally engage the target 10 would result in damage to the vehicle 2, as the weapon 6 shot would encounter the wing part of the vehicle 6, instead of the target 10.

The weapon system 6 for use on a vehicle 2 also comprises a control system 4. The control system 4 could be, for example, a processor configured to perform the tasks described below. In detail, the control system 4 may receive a determination that the line-of-sight 12 from the weapon 6 to the target 10 is currently, or going to be, obscured. This determination could be received from an external device, a radar, or a sensor attached to the vehicle 2. This determination could also be received, via a network, from an air traffic control tower. In one embodiment, the control system 4 itself performs the determination. The result of the determination could indicate, for example, that the line-of-sight 12 from the weapon 6 to the target 10 is currently obscured, or that it is going to be obscured in the near future, for example in the next thirty seconds or in an expected or desired engagement period with the target 10.

In response to a determination that the line-of-sight 12 from the weapon 6 to the target 10 is currently, or going to be, obscured, the control system 4 is configured to trigger an alteration of a configuration of the vehicle 2 such that the line-of-sight 12 is not obscured. That is, the control system 12 provides appropriate commands to actuators of the vehicle 2 to alter the configuration of the vehicle 2. For example, and strictly by way of example only, if the vehicle 2 is an aircraft, the control system 4 may give a command to flight control surfaces (such as ailerons of the aircraft) to alter the configuration of the vehicle 2 such that the line-of-sight 12 is not obscured. The alteration of the configuration of the vehicle 2 could be one or more of a change in an orientation of the vehicle, a change in an attitude of the vehicle, and a change in a shape of the vehicle. For example, the vehicle or a portion of the vehicle might turn and the vehicle change movement direction, the vehicle or a portion of the vehicle might turn and the vehicle maintain movement direction, or a portion of the vehicle could simply be moved out of the way of the line-of-sight (e.g. a turret, a barrel, or a variable sweep wing, could be moved).

FIG. 2 is another view of the same vehicle 2 as depicted in FIG. 1, and for the ease of understanding, the same reference numerals have been used. The vehicle 2 of FIG. 2 is in a different configuration to that of FIG. 1. In detail, referring to FIG. 2, and compared with FIG. 1, the vehicle 2 has changed its orientation such that the line-of-sight 12 to the target 10 is not obscured by any element of the vehicle. Since the line-of-sight 12 to the target 10 is not obstructed by the wing (or any other component) of the vehicle 2, employing the weapon 6 to engage the target 10 would not damage the vehicle 2. Ideally, the weapon system should be able to continuously engage the target 10 during relative movement between the weapon system and the target 10. By altering the configuration of the vehicle 2 in concert with the movement of the target 10 such that the line-of-sight 12 is not obscured, continuous engagement may be achieved. This might involve repeated or continuous re-configuration of the vehicle.

The vehicle 2 could be a manned vehicle, or an unmanned vehicle. For example, and strictly by way of example only, the vehicle 2 could be any one of a conventionally piloted vehicle, an optionally piloted vehicle, and an unmanned aerial or terrestrial vehicle. In case of a conventionally piloted vehicle, the control system 4 may override any vehicle configuration commands provided by the pilot (e.g. user) of the vehicle, or controller in general (e.g. including commands or input or control form a control system, for example an at least partially automated control system), in order to provide and prioritise protection of the vehicle 2, and any accompanying personnel on board, from a threat. For example, if the line-of-sight 12 from the weapon 6 to the target 10 is determined not to be obscured, and the pilot inputs a command which would cause the line-of-sight 12 from the weapon 6 to the target 10 to be obscured, the control system 4 overrides the commands provided by the pilot, such that the line-of-sight 12 remains unobscured.

Similarly, if the line-of-sight 12 from the weapon 6 to the target 10 is determined to be obscured, the control system 4 overrides the commands provided by the pilot, such that the line-of-sight 12 becomes unobscured.

Continuous engagement without obscuration is especially important in case of directed-energy weapons, where the target might need to be continuously engaged for a given amount of time in order to ensure adequate damage to the target. Furthermore, there may be a rapidly changing, dynamic situation, where targets are being engaged in a rapidly changing manner. Such a situation, of course, increases the risk of an object other than the intended target being unintentionally engaged and/or damaged by the weapon system. It is, of course, desirable to avoid this situation.

According to an example embodiment, it has been realised that the risk of unintentional damage to objects other than the intended target can be largely reduced or even avoided by providing a control system for a weapon system that is configured to, in response to a determination that the line-of-sight from the weapon to the target is currently, or going to be, obscured, alter a configuration of the vehicle such that the line-of-sight from the weapon to the target is not obscured.

As discussed above, the line-of-sight from the weapon 6 to a target 10 may be obscured by parts of the vehicle 2, meaning that the area covered by the weapon 6 is less than 4π steradians, thereby reducing the effectiveness of the weapon system in protecting the vehicle 2 from incoming threats such as missiles. Some systems, such as Directed Infrared Countermeasure Systems (DIRCMs) employ gimbals to increase coverage above what would be possible with a static installation. However, the number of gimballed apertures required to provide full coverage would be impractical.

FIG. 3 illustrates a weapon system for use on a vehicle according to another example embodiment. In this embodiment, the weapon 6 is a directed-energy weapon, and comprises one or more apertures 8 for outputting an energy beam. The one or more apertures 8 may be gimballed in order to further increase coverage. The control system 4 controls the weapon 6 to employ one of the one or more of the apertures 8 based on probability of successfully engaging the target. That is, if it is determined that the line-of-sight 12 from the weapon 6 to the target 10 is currently, or going to be obscured, the control system 4 may control the weapon 6 to employ one of the one or more apertures 8, such that the line-of-sight 12 from the employed aperture 8 to the target 10 is not obscured. This feature, combined with altering the configuration of the vehicle, further contributes to the increased coverage of the weapon system. The choice or implementation of configuration change and/or aperture usage might involve a calculation as to the most efficient and effective option.

FIG. 4 illustrates the control system 4 in more detail. The control system 4 is configured to receive an input 7. Said input can be, for example, an input indicating a determination has been made that the line-of-sight 12 from the weapon 6 to the target 10 is currently, or going to be, obscured (or currently is obscured), or an input relating to the relative position of the target 10 with respect to the weapon system, acquired from an external sensor. In response to receiving the input 7 relating to the relative position of the target 10 with respect to the weapon system, the control system 4 can determine whether the line-of-sight 12 is currently, or going to be, obscured. Alternatively, the control system 4 can simply receive the determination from elsewhere, e.g. from an external processor. The control system 4 is configured to output an output 9. Said output 9 can be, for example, an output to trigger the alteration of the configuration of the vehicle 2, said output generated by the control system 4 in response to the determination that the line-of-sight 12 is currently, or going to be obscured. The output 9 may be transmitted, for example, to the vehicle's actuators, or any other control systems directly or indirectly controlling the actuators. The described control system 4 may be implemented in hardware, in software, or a combination of both.

Importantly, the control system 4 is designed as such to enable retrofitting of said control system 4 onto vehicles other than the exemplary vehicle 2. That is, other vehicles comprising weapons may also benefit from the weapon system described herein. Indeed, other vehicles can be retrofitted with control system 4. Retrofitting might not require hardware modifications. Instead, the invention might be implemented via a software modification or upgrade.

FIG. 5 describes general methodology associated with recently described embodiments. The method is for controlling a weapon system of a vehicle. The method comprises determining that a line-of-sight from the weapon system to a target of the weapon system is currently, or going to be obscured S100, and in response thereto, triggering an alteration of a configuration of the vehicle such that the line-of-sight to the target is not obscured S110.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A weapon system for use on a vehicle, the weapon system comprising:
    a control system configured to, in response to a determination that a line-of-sight from the weapon system to a target of the weapon system is currently, or going to be obscured, trigger an alteration of a configuration of the vehicle such that the line-of-sight to the target is not obscured,
    wherein to trigger the alteration of the configuration of the vehicle, the control system is configured to at least one of
        trigger an alteration of a direction of movement of the vehicle,
        cause to move at least a portion of the vehicle from the line-of-sight,
        trigger an alteration of a shape of the vehicle, or
        trigger an alteration of an attitude of the vehicle.

2. The weapon system according to claim 1, wherein the control system is configured to trigger the alteration of the configuration of the vehicle such that the line-of-sight to the target is not obscured by an element of the vehicle.

3. The weapon system according to claim 1, wherein the control system is configured to trigger the alteration of the vehicle so as to enable the weapon system to continuously engage the target during relative movement between the weapon system and the target.

4. The weapon system according to claim 1, wherein the control system is configured to determine whether the line-of-sight to the target is currently, or going to be obscured.

5. The weapon system according to claim 1, further comprising:
a directed-energy weapon configured to output an energy beam at the target.

6. The weapon system according to claim 5, wherein the directed-energy weapon comprises one or more apertures for outputting an energy beam.

7. The weapon system according to claim 6, wherein the one or more apertures are gimballed.

8. The weapon system according to claim 6, wherein the control system is further configured to control the directed-energy weapon to employ one of the apertures, based on a probability of successfully engaging the target.

9. The weapon system according to claim 1, wherein the control system is further configured to, in response to a determination that the line-of-sight to the target is currently, or going to be obscured, override one or more vehicle configuration commands provided by a controller of the vehicle, such that the line-of-sight to the target is not to be obscured.

10. The weapon system according to claim 1, wherein the vehicle comprises one of: an air platform, a land vehicle, and a watercraft.

11. A vehicle comprising the system of claim 1.

12. The vehicle control system according to claim 1, wherein to trigger the alteration of the configuration of the vehicle, the control system is configured to at least two of:
trigger the alteration of the direction of movement of the vehicle,
cause to move at least the portion of the vehicle from the line-of-sight,
trigger the alteration of the shape of the vehicle, or
trigger the alteration of the attitude of the vehicle.

13. A method of controlling a weapon system of a vehicle, comprising:
in response to a determination that a line-of-sight from the weapon system to a target of the weapon system is currently, or going to be obscured, triggering an alteration of a configuration of the vehicle such that the line-of-sight to the target is not obscured, wherein triggering the alteration of the configuration of the vehicle comprises
triggering an alteration of a direction of movement of the vehicle,
causing to move at least a portion of the vehicle from the line-of-sight,
triggering an alteration of a shape of the vehicle, and/or triggering an alteration of an attitude of the vehicle.

14. The method according to claim 13, further comprising:
in response to determining that the line-of-sight from the weapon system to the target of the weapon system is currently, or going to be obscured, overriding one or more commands provided by a controller of the vehicle, so that the line-of-sight to the target is not to be obscured.

15. A vehicle control system, comprising:
a processor configured to, in response to a determination that a line-of-sight from a weapon system to a target of the weapon system is currently, or going to be obscured, trigger an alteration of a configuration of a vehicle such that the line-of-sight to the target is not obscured,
wherein the processor is configured to trigger the alteration of the configuration of the vehicle by changing an orientation of the vehicle, an attitude of the vehicle, and/or a shape of the vehicle, such that the line-of-sight to the target is not obscured.

16. The vehicle control system according to claim 15, wherein the processor is configured to override one or more vehicle configuration commands provided by a user of the vehicle, such that the line-of-sight to the target is not obscured during an engagement of the target.

17. The vehicle control system according to claim 15, wherein the weapon system includes a directed-energy weapon configured to output an energy beam.

18. The vehicle control system according to claim 15, wherein the processor is configured to:
perform the determination based on information received from a source external to the system and/or information determined by the system; and
in response to a determination that the line-of-sight to the target is currently, or going to be obscured, override one or more vehicle configuration commands provided by a user of the vehicle, such that the line-of-sight to the target is not to be obscured.

19. A vehicle comprising the vehicle control system according to claim 15.

20. The vehicle control system according to claim 15, wherein the processor is configured to trigger the alteration of the configuration of the vehicle by at least two of:
changing the orientation of the vehicle,
changing the attitude of the vehicle,
changing the shape of the vehicle,
changing a direction of movement of the vehicle, or
moving at least a portion of the vehicle from the line-of-sight.

* * * * *